(12) United States Patent
Wang et al.

(10) Patent No.: US 8,861,882 B2
(45) Date of Patent: Oct. 14, 2014

(54) METHOD AND DEVICE FOR ELIMINATING IMAGE BLUR BY PIXEL-BASED PROCESSING

(75) Inventors: Shih-Chung Wang, Hsin-Chu (TW); Yi-Fan Chen, Tai-Chung (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1067 days.

(21) Appl. No.: 12/273,563

(22) Filed: Nov. 19, 2008

(65) Prior Publication Data

US 2009/0129698 A1    May 21, 2009

(30) Foreign Application Priority Data

Nov. 21, 2007    (TW) ................ 96144105 A

(51) Int. Cl.
| | |
|---|---|
| G06K 9/40 | (2006.01) |
| G06K 9/42 | (2006.01) |
| G06K 9/44 | (2006.01) |
| H04N 5/21 | (2006.01) |
| G09G 5/10 | (2006.01) |
| G09G 3/36 | (2006.01) |
| H04N 5/14 | (2006.01) |
| G06T 5/00 | (2006.01) |
| G09G 3/20 | (2006.01) |
| G06T 5/50 | (2006.01) |

(52) U.S. Cl.
CPC ... *G09G 3/20* (2013.01); *G06T 5/50* (2013.01); *G06T 2207/20201* (2013.01); *G09G 2320/0271* (2013.01); *G09G 3/3611* (2013.01); *H04N 5/144* (2013.01); *G09G 2320/0261* (2013.01); *G09G 2320/0252* (2013.01); *G09G 2340/16* (2013.01); *G06T 5/003* (2013.01); *G09G 2320/0285* (2013.01); *G06T 2207/20224* (2013.01)
USPC ............ 382/255; 382/261; 348/630; 345/690

(58) Field of Classification Search
USPC ................. 382/100, 107, 128, 162, 168, 209, 382/217–218, 232, 236, 254–255, 260–261, 382/263, 275–276, 289; 348/208.4, 606, 348/699–702; 345/87, 204, 723, 602, 611, 345/619, 647, 672, 501, 519, 530, 690; 375/240–240.02, 240.16
See application file for complete search history.

(56) References Cited

U.S. PATENT DOCUMENTS

| | | | | |
|---|---|---|---|---|
| 5,847,772 | A * | 12/1998 | Wells | 348/571 |
| 6,501,451 | B1 * | 12/2002 | Sakashita | 345/87 |
| 2003/0056167 | A1 * | 3/2003 | Yuan et al. | 714/759 |
| 2003/0120365 | A1 * | 6/2003 | Asano et al. | 700/86 |

(Continued)

OTHER PUBLICATIONS

Wang, J., Min, K. Y. and Chong, J. W. 2007. A hybrid image coding in overdrive for motion blur reduction in LCD. In Proc. of 6th Int. Computer Entertainment Computing (ICEC'07), Sep. 17-19, 2007, Shanghai, China, 263-270, Springer.*

*Primary Examiner* — Randolph I Chu
*Assistant Examiner* — Nathan Bloom
(74) *Attorney, Agent, or Firm* — Winston Hsu; Scott Margo

(57) ABSTRACT

A method for eliminating image blur includes: detecting the difference in pixel value between two corresponding pixels in two continuous images to generate a difference value; and adjusting the luminance of the two corresponding pixels according to the difference value, wherein when the difference value exceeds a predetermined value, the luminance of one pixel of the two corresponding pixels is increased and the luminance of the other pixel is decreased.

16 Claims, 6 Drawing Sheets

(56) References Cited

U.S. PATENT DOCUMENTS

| | | | |
|---|---|---|---|
| 2005/0030302 A1* | 2/2005 | Nishi et al. | 345/204 |
| 2005/0062701 A1* | 3/2005 | Furuhashi et al. | 345/89 |
| 2005/0232356 A1* | 10/2005 | Gomi et al. | 375/240.16 |
| 2006/0028492 A1* | 2/2006 | Yamaguchi et al. | 345/690 |
| 2006/0044472 A1* | 3/2006 | Lee et al. | 348/607 |
| 2007/0164932 A1* | 7/2007 | Moon | 345/63 |
| 2008/0123987 A1* | 5/2008 | Shen et al. | 382/255 |
| 2008/0279470 A1* | 11/2008 | Warmuth et al. | 382/255 |
| 2008/0309823 A1* | 12/2008 | Hahn et al. | 348/606 |
| 2009/0080517 A1* | 3/2009 | Ko et al. | 375/240.03 |
| 2009/0109290 A1* | 4/2009 | Ye et al. | 348/155 |
| 2012/0162545 A1* | 6/2012 | Shiomi et al. | 348/790 |

* cited by examiner

METHOD AND DEVICE FOR ELIMINATING IMAGE BLUR BY PIXEL-BASED PROCESSING

BACKGROUND OF THE INVENTION

1. Field of the Invention

The present invention relates to solutions of motion image blur of hold type display devices, and more particularly, to methods and devices for eliminating image blur by utilizing pixel-based processing.

2. Description of the Prior Art

Regarding hold type display devices, for example, active matrix liquid crystal displays (AMLCDs), motion image blur has been a widely discussed issue. The causes of motion image blur comprise over-long response time of liquid crystal, capacitance variation of pixels, and so-called sample and hold artifacts.

The image blur problem related to the former two causes can be solved by utilizing a method such as voltage overdrive. However, due to the combination of the sampling characteristics of AMLCDs and the smooth motion tracking characteristics of the visual system of a user, it is not easy to conquer the image blur problem related to the last cause, so the corresponding drawback still commonly exists in liquid crystal displays (LCDs) launched on the market. According to the prior art, solutions to sample and hold artifacts are not perfect. For example, a prior art solution is to destroy the effect of sample and hold artifacts by intermittently replacing data of a portion of images with data of all-black images to break visual continuity. Further taking another prior art solution as an example, the solution is to destroy the effect of sample and hold artifacts by intermittently turning off the power of the backlight of LCD panels to break visual continuity. However, the prior art solutions both introduce a new problem of decreased overall luminance of images.

In addition, the solutions provided by the prior art usually need very complex mechanism and result in a very high R&D/manufacturing cost. Therefore, these solutions are not suitable for being led in and applied to the products on the market.

SUMMARY OF THE INVENTION

It is therefore an objective of the claimed invention to provide methods and devices for eliminating image blur to solve the above-mentioned problem.

It is another objective of the claimed invention to provide methods and devices for eliminating image blur, in order to solve the motion image blur problem of hold type display devices.

It is another objective of the claimed invention to provide methods and devices for eliminating image blur to deal with sample and hold artifacts of displayed images on display devices.

According to one embodiment of the claimed invention, a method for eliminating image blur is disclosed. The method comprises: detecting the difference in pixel value between two corresponding pixels in two continuous images to generate a difference value; and adjusting the luminance of the two corresponding pixels according to the difference value, wherein when the difference value exceeds a predetermined value, the luminance of one pixel of the two corresponding pixels is increased and the luminance of the other pixel is decreased.

While providing the method mentioned above, the claimed invention further provides a device for eliminating image blur. The device comprises: a pixel detection circuit, for detecting the difference in pixel value between two corresponding pixels in two continuous images to generate a difference value; and an adjustment circuit, for adjusting the luminance of the two corresponding pixels according to the difference value, wherein when the difference value exceeds a predetermined value, the luminance of one pixel of the two corresponding pixels is increased and the luminance of the other pixel is decreased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
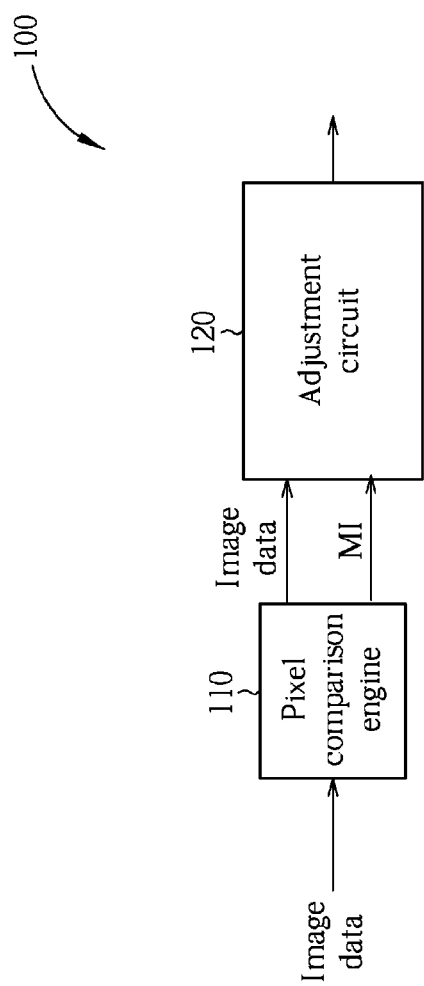
FIG. 1 is a diagram of a device for eliminating image blur according to a first embodiment of the present invention.

Please refer to FIG. 1. FIG. 1 is a diagram of a device 100 for eliminating image blur according to a first embodiment of the present invention, where the device 100 can be installed/positioned in a hold type display device such as an active matrix liquid crystal display (AMLCD), and is capable of eliminating image blur of the hold type display device, and more particularly, is capable of eliminating the aforementioned sample and hold artifacts.

The device 100 comprises a pixel-based motion detector, which is hereafter referred to as the motion detector for simplicity. In this embodiment, the motion detector is utilized for performing motion detection on two pixels with corresponding positions in two continuous images of a video signal to generate a detection result. As shown in FIG. 1, the motion detector of this embodiment is a pixel comparison engine 110, where the comparison engine 110 determines whether the detection result corresponds to dynamic images or static images by detecting whether a difference in pixel value between two pixels with corresponding positions in the two continuous images (e.g. two pixels with the same position) exceeds a predetermined threshold value or not. According to this embodiment, if the difference exceeds the threshold, the detection result corresponds to dynamic images; otherwise, the detection result corresponds to static images. In addition, as shown in FIG. 1, the device 100 further comprises an adjustment circuit 120 that is capable of respectively adjusting the luminance of the two pixels with corresponding positions in the two continuous images according to a look-up table corresponding to the detection result.

According to this embodiment, the detection result is indicated by the state of a motion index (MI) shown in FIG. 1. Thus, the motion index MI carrying the detection result can control the operation of the adjustment circuit 120. When the detection result indicates that the two pixels correspond to dynamic images, the motion index MI is in a first state (e.g. the logical value "1"). In this situation, the adjustment circuit 120 increases the luminance of one pixel of the two pixels and further decreases the luminance of the other pixel to interrupt motion tracking of the visual system of a user in order to prevent from generation of the feeling of image blur. On the contrary, when the detection result indicates that the two pixels correspond to static images, the motion index MI is in a second state (e.g. the logical value "0"). In this situation, the adjustment circuit 120 performs the same gamma transform on the two pixels. According to a variation of this embodiment, when the detection result indicates that the two pixels correspond to static images, the adjustment circuit 120 does not perform any adjustment on the two pixels.

As the cause of the sample and hold artifacts is closely related to the visual continuity, and as the luminance adjustment mechanism of this embodiment not only breaks the visual continuity but also performs the adjustment of increasing the luminance of pixels of one of each two successive images and decreasing the luminance of pixels of the other of the two successive images when adjusting the luminance, the present invention is capable of eliminating the sample and hold artifacts mentioned above while the proper average luminance is still maintained without having the problem of decreased overall luminance of images as seen in the prior art.

Figure 2:
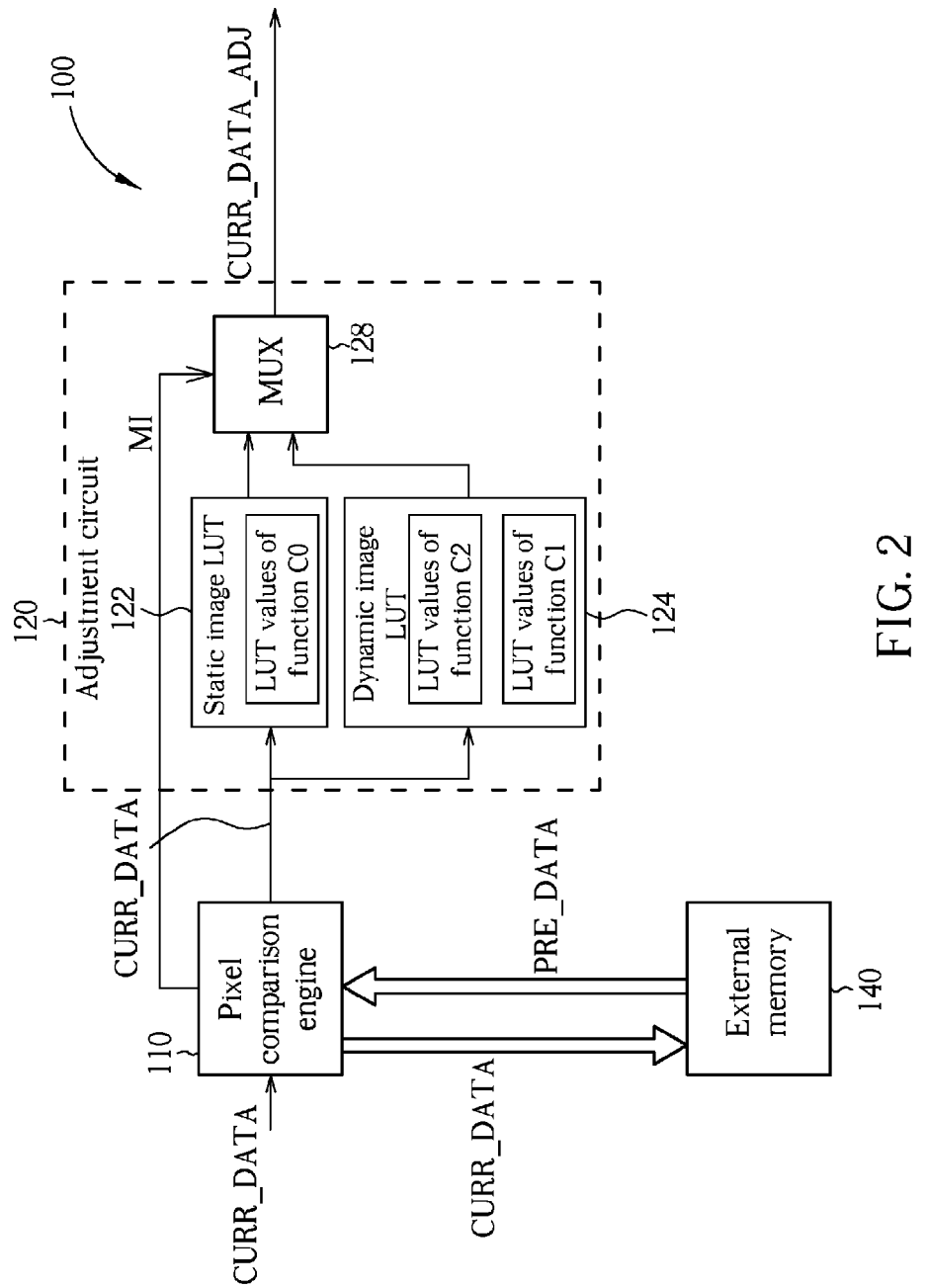
FIG. 2 illustrates implementation details of the device shown in FIG. 1 according to one embodiment of the present invention, where this embodiment is a variation of the first embodiment.

FIG. 2 illustrates implementation details of the device 100 shown in FIG. 1 according to one embodiment of the present invention, where this embodiment is a variation of the first embodiment. As shown in FIG. 2, the device 100 further comprises an external memory 140 for temporarily storing image data of the video signal. In this embodiment, the external memory 140 is a synchronous dynamic random access memory (SDRAM).

The previous data PRE_DATA and the current data CURR_DATA shown in FIG. 2 respectively represent the pixel data of two continuous images. For example, when the current data CURR_DATA represents the pixel data of frame F(n), the previous data PRE_DATA represents the pixel data of frame F(n−1). In addition, the adjusted current data CURR_DATA_ADJ represents the result of processing the current data CURR_DATA by utilizing the adjustment circuit 120.

According to this embodiment, the adjustment circuit 120 comprises a plurality of look-up tables (LUTs) utilized for adjusting the luminance of images of the video signal by looking up the LUT(s). As shown in FIG. 2, the plurality of LUTs comprises a static image LUT 122 and at least one dynamic image LUT 124. When the detection result indicates that the two pixels correspond to static images, the adjustment circuit 120 adjusts the luminance of the two pixels by looking up the static image LUT 122. When the detection result indicates that the two pixels correspond to dynamic images, the adjustment circuit 120 adjusts the luminance of the two pixels by looking up the dynamic image LUT 124.

As shown in FIG. 2, the adjustment circuit 120 further comprises a multiplexer 128. Regarding the adjusted pixel data of the two pixels, the multiplexer 128 of this embodiment selects one of the adjusted pixel data derived by utilizing the static image LUT 122 and the adjusted pixel data derived by utilizing the dynamic image LUT 124 as the output of the adjustment circuit 120 according to the detection result represented by the motion index MI. Thus, through the selection operation of the multiplexer 128, the adjustment circuit 120 of this embodiment can utilize the static image LUT 122 or the dynamic image LUT 124 to adjust the luminance of the two pixels.

In this embodiment, the contents stored within the LUTs (i.e. values/data) represent transfer function(s). The static image LUT 122 stores data representing a transfer function for adjusting the pixels. For example, the static image LUT 122 comprises LUT values representing a function C0. In addition, the dynamic image LUT 124 stores data representing two different transfer functions for adjusting the pixels. For example, the dynamic image LUT 124 comprises LUT values representing a function C1 and LUT values representing a function C2, where the function C2 is utilized for increasing the luminance of images, and the function C1 is utilized for decreasing the luminance of images.

Figure 3:
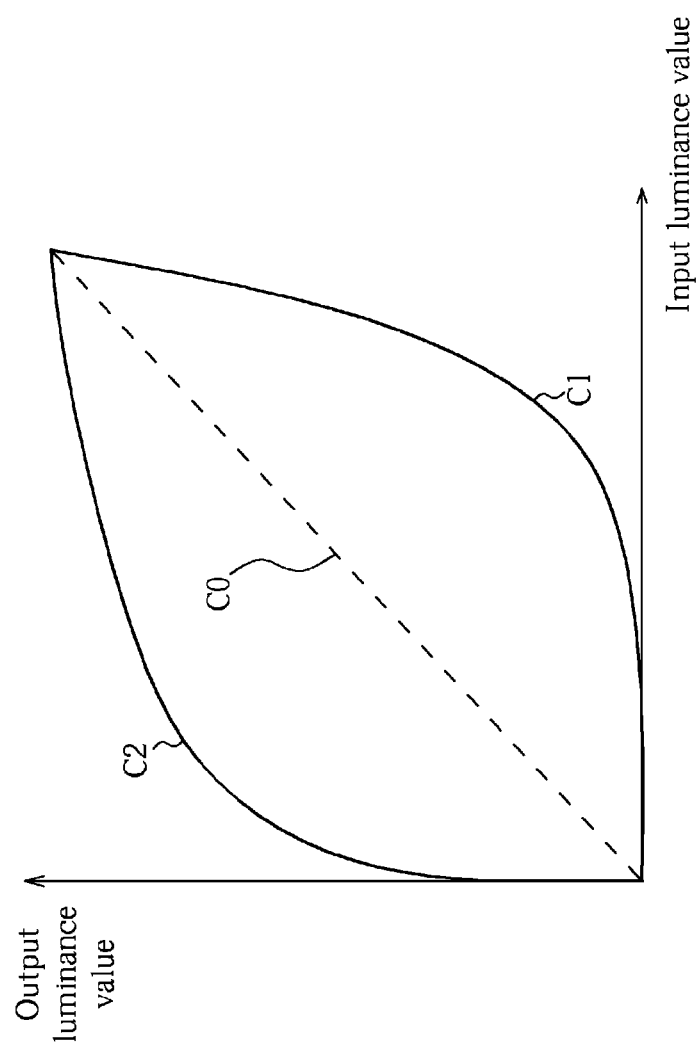
FIG. 3 illustrates transfer functions that can be utilized by the adjustment circuit shown in FIG. 1 according to a variation of the first embodiment.

FIG. 3 illustrates transfer functions that can be utilized by the adjustment circuit 120 shown in FIG. 2. The shapes of the curves of the transfer functions C0, C1 and C2 as illustrated are only one of various kinds of variations, and are not meant to limit the scope of the present invention. For example, in another variation of the first embodiment, the shape of the curve of function C0 is not a straight line.

In one embodiment, the two transfer functions provided from the dynamic image LUT 124 are selected from a group of predetermined transfer functions. More particularly, the transfer function provided from the static image LUT 122 and the transfer functions provided from the dynamic image LUT 124 are all gamma transfer functions, where each transfer function corresponds to a different gamma value.

For example, when the detection result indicates that the two pixels correspond to static images, the adjustment circuit 120 utilizes the same transfer function corresponding to the same gamma value GAMMA0 as the adjustment mechanism for two continuous images, respectively, where GAMMA0 is between GAMMA1 and GAMMA2. As a result, the adjustment circuit 120 utilizes the same gamma value GAMMA0 to perform default gamma transform on pixels belonging to static images within frames F(n) and F(n−1).

Conversely, when the detection result indicates that the two pixels correspond to dynamic images, the adjustment circuit 120 utilizes transfer functions corresponding to different gamma values GAMMA1 and GAMMA2 as the adjustment mechanism for two continuous images, respectively. As a result, the adjustment circuit 120 utilizes the gamma value GAMMA2 to increase the luminance of the pixels corresponding to dynamic image(s) within the frame F(n) respectively and further utilizes the gamma value GAMMA1 decrease the luminance of the pixels corresponding to dynamic image(s) within the frame F(n−1) respectively.

Figure 4:
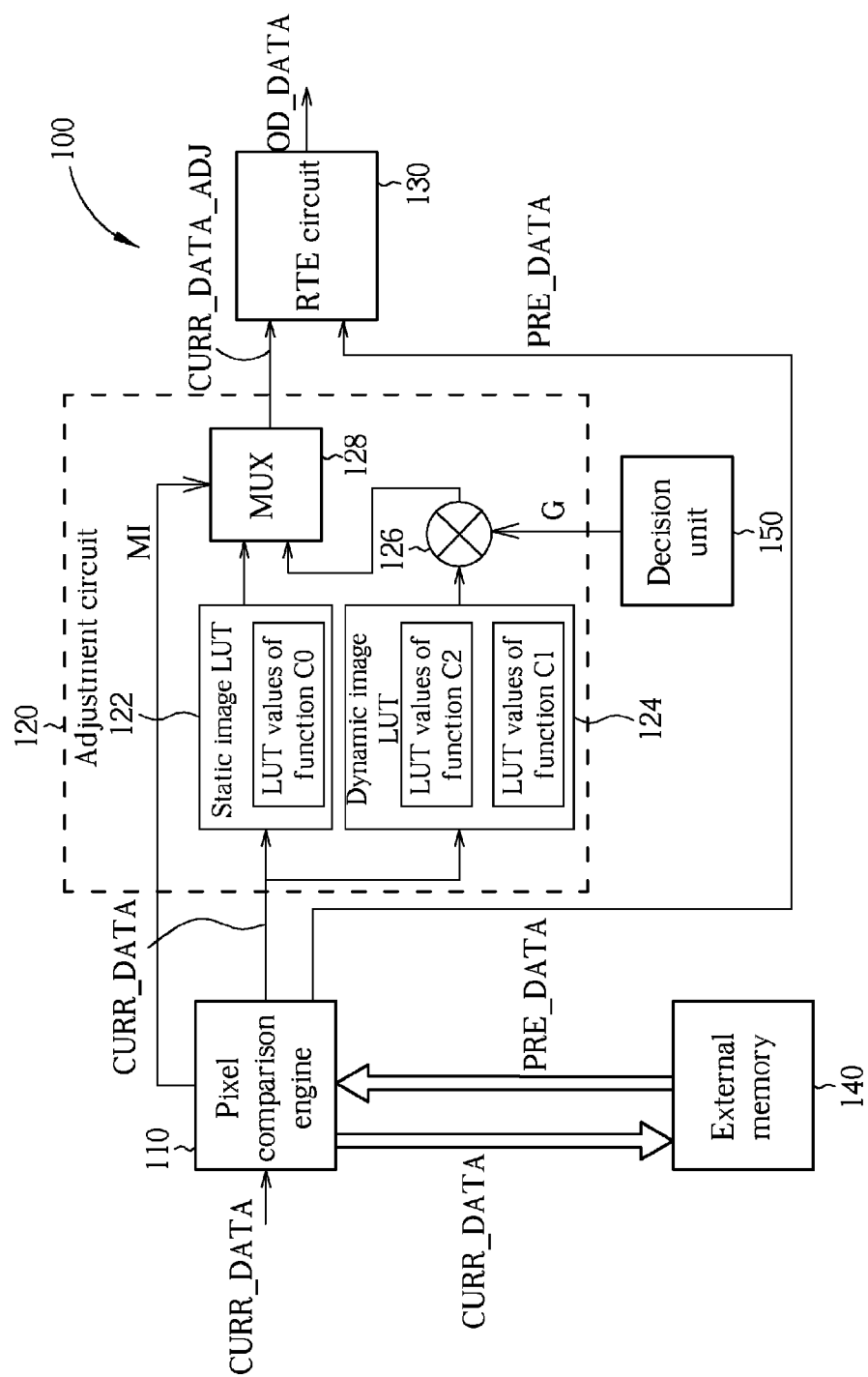
FIG. 4 illustrates implementation details of the device shown in FIG. 1 according to another embodiment of the present invention, where this embodiment is another variation of the first embodiment, and is also a variation of the embodiment shown in FIG. 2.

FIG. 4 illustrates implementation details of the device 100 shown in FIG. 1 according to another embodiment of the present invention. As shown in FIG. 4, the adjustment circuit 120 further comprises a gain adjustment unit 126. The circuit functionalities of the gain adjustment unit 126 for the lower path within the adjustment circuit 120 are described as follows.

In this embodiment, the gain adjustment unit 126 adjusts the adjusted pixel data derived by utilizing the dynamic image LUT 124 according to a gain value G, so as to adjust the luminance of the video contents of the video signal. Here, the device 100 further comprises a decision unit 150 determining proper values of the gain value G for different frames F(N) (N=0, 1, . . . , n, (n+1), . . . ) with the proper values being utilized by the gain adjustment unit 126 for different frames F(N), respectively. Thus, the gain value G may be written as $G_N$. In this embodiment, the gain values utilized by two continuous frames, such as $G_n$ and $G_{n+1}$, correspond to each other, so the LUT values of function C2 and the gain value $G_n$ constitutes a function ($G_n$*C2), and the LUT values of function C1 and the gain value $G_{n+1}$ constitutes a function ($G_{n+1}$*C1).

As shown in FIG. 4, in this embodiment, the device 100 further comprises a response time enhancement (RTE) circuit 130 for selectively performing overdrive (OD) processing, where overdrive data OD_DATA represents the pixel data output by the RTE circuit 130. A plurality of components of the device 100 of this embodiment, such as the pixel comparison engine 110, the adjustment circuit 120 and the RTE circuit 130, are integrated into a chip. In practice, the LUTs are implemented with the embedded memory within the chip and the corresponding memory access control circuit.

The motion index MI mentioned above can control the adjustment circuit 120 and the RTE circuit 130 simultaneously. When the detection result indicates that the two pixels correspond to dynamic images, the motion index MI is in the first state (e.g. the logical value "1"). In this situation, the RTE circuit 130 turns on the overdrive processing, for example, the RTE circuit 130 performs overdrive processing on the two pixels. On the contrary, when the detection result indicates that the two pixels correspond to static images, the motion index MI is in the second state (e.g. the logical value "0"). In this situation, the RTE circuit 130 turns off the overdrive processing.

Additionally, according to a variation of this embodiment, the transfer functions respectively corresponding to R/G/B color channels are not the same, and the adjustment circuit 120 in this variation operates according to the transfer functions corresponding to R/G/B color channels, respectively.

Figure 5:
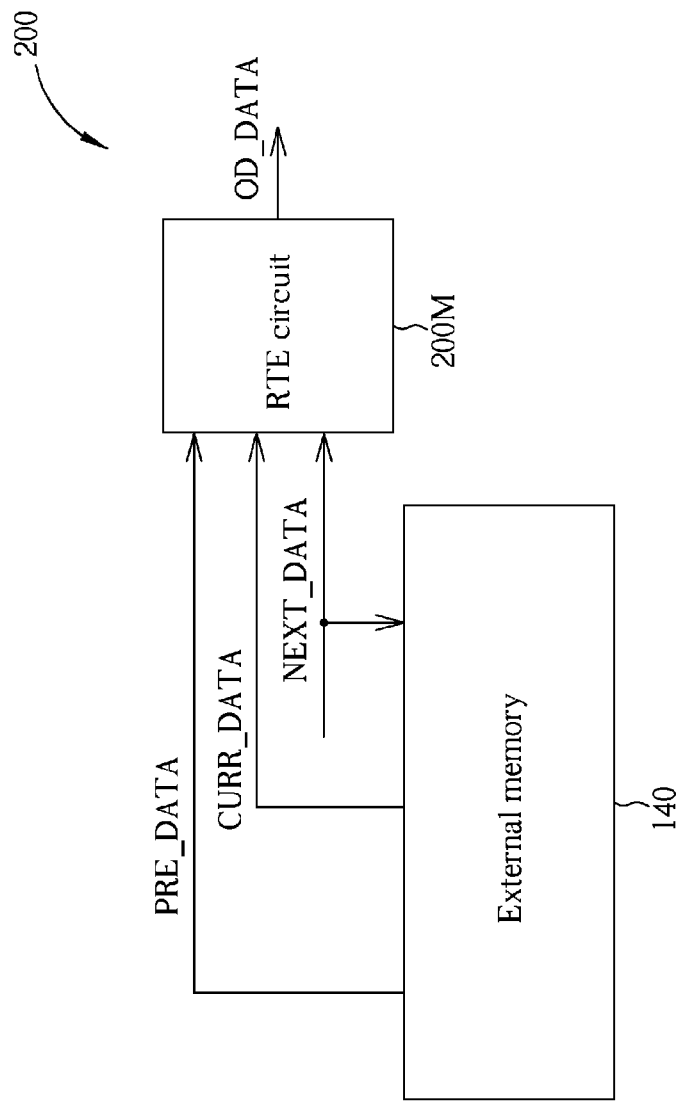
FIG. 5 is a diagram of a device for eliminating image blur according to a second embodiment of the present invention, where the second embodiment is another variation of the first embodiment, and is also a variation of the embodiment shown in FIG. 4.
Figure 6:
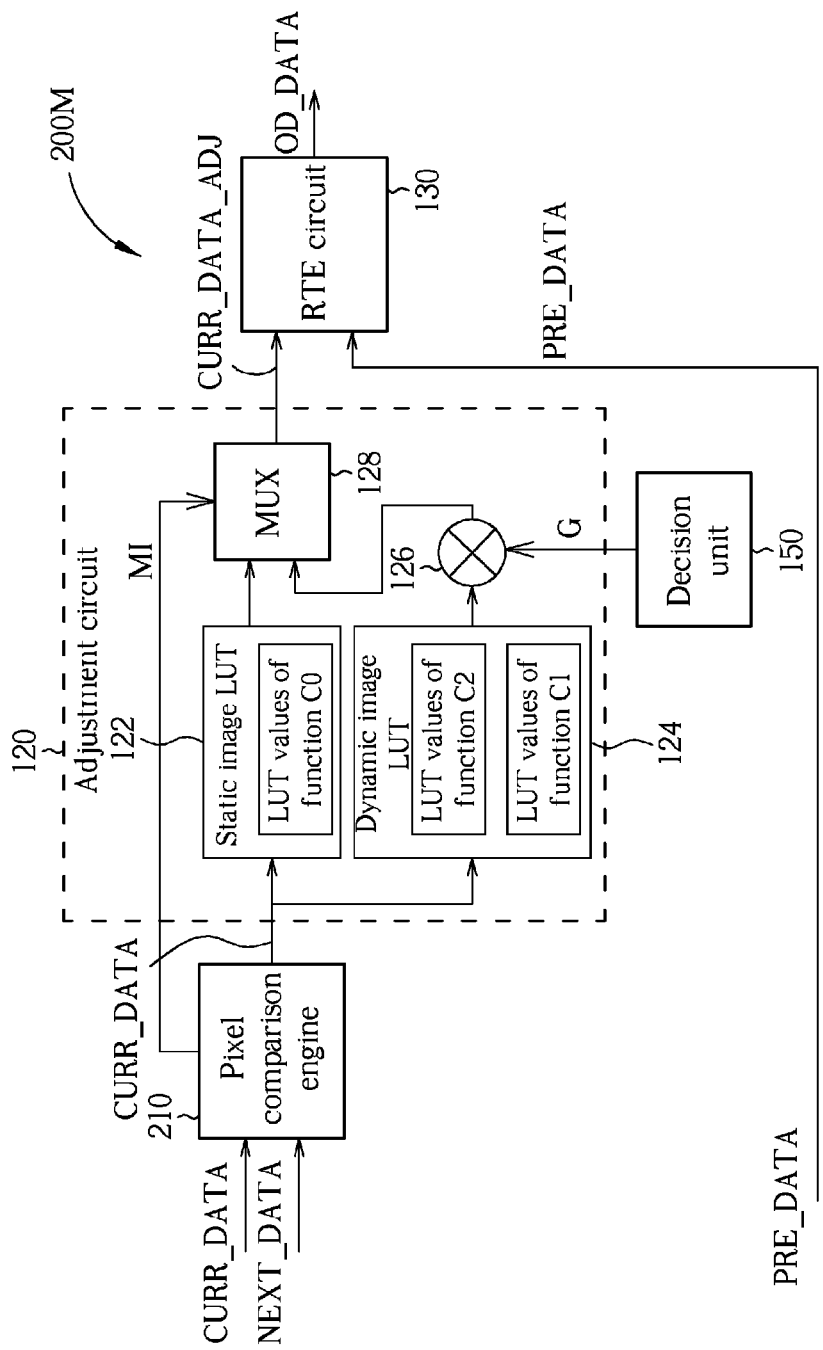
FIG. 6 is a diagram of a dynamic adjustment and response time enhancement (RTE) module shown in FIG. 5.

Please refer to FIG. 5 and FIG. 6. FIG. 5 is a diagram of a device 200 for eliminating image blur according to a second embodiment of the present invention, and FIG. 6 is a diagram of a dynamic adjustment and response time enhancement (RTE) module 200M shown in FIG. 5. The second embodiment is a variation of the embodiment shown in FIG. 4, where the differences between the two embodiments are described as follows. In the second embodiment, the data path of the previous data PRE_DATA does not pass through a pixel comparison engine 210 of this embodiment, as shown in FIG. 5 and FIG. 6. According to this architecture, the pixel comparison engine 210 compares the current data CURR_DATA and next data NEXT_DATA. For example, the previous data PRE_ DATA, the current data CURR_DATA, and the next data NEXT_DATA correspond to the frame data of frames F(n−1), F(n), and F(n+1), respectively. Before the device 200 completes processing the current data CURR_DATA which is being displayed on the display device coupled to the device 200, the next data NEXT_DATA has been input into the device 200 for being compared, so the dynamic adjustment and RTE module 200M of this embodiment can adjust the current data CURR_DATA in real time according to the next data NEXT_DATA.

In contrast to the embodiment shown in FIG. 4, the device 200 can perform the comparisons between the previous data PRE_DATA, the current data CURR_DATA and the next data NEXT_DATA at the same time in order to dynamically determine whether to use the static image LUT 122 or the dynamic image LUT 124, and can further process the adjusted current data CURR_DATA_ADJ by utilizing the RTE circuit 130 immediately to generate the overdrive data OD_DATA for being displayed by the display device in real time.

It is an advantage of the present invention that the methods and devices of the present invention can eliminate image blur by utilizing pixel-based processing, and more particularly, can eliminate the sample and hold artifacts. Therefore, after the adjustment through the present invention methods and devices, images seen by users will not have the such luminance inaccuracy/deficiency problems in the prior art.

Those skilled in the art will readily observe that numerous modifications and alterations of the device and method may be made while retaining the teachings of the invention.

What is claimed is:

1. A method for eliminating image blur, comprising:
  for each pixel in a first image and a second image, wherein the first image and the second image are two continuous images:
    receiving a current pixel from the first image;
    receiving a previous pixel from the second image, wherein the current pixel and the previous pixel respectively represent pixel data of the first image and the second image;
    detecting a difference in pixel value between the current pixel and the previous pixel to generate a difference value; and
    adjusting the luminance of the current pixel and the previous pixel according to the difference value, wherein when the difference value exceeds a predetermined value, the luminance of one of the current pixel and the previous pixel is increased and the luminance of the other of the current pixel and the previous pixel is decreased;
  wherein the method eliminates the image blur by utilizing pixel-based processing to perform the steps of detecting and adjusting upon the current pixel and the previous pixel by pair independently until every two pixel data in the first and second images are detected and adjusted, and the two continuous images are two time-sequential images.

2. The method of claim 1, wherein the step of adjusting the luminance of the current pixel and the previous pixel according to the difference value further comprises:
  adjusting the luminance of the current pixel and the previous pixel by looking up a dynamic image look-up table (LUT) when the difference value exceeds the predetermined value.

3. The method of claim 2, wherein the dynamic image LUT stores data representing two transfer functions, one of the two transfer functions is utilized for increasing the luminance of images, and the other of the two transfer functions is utilized for decreasing the luminance of images.

4. The method of claim 2, wherein the dynamic image LUT stores data representing a plurality of transfer functions, each transfer function of the plurality of transfer functions corresponds to a different gamma value, and when the difference value exceeds the predetermined value, the luminance of the current pixel and the previous pixel are adjusted according to the data corresponding to two of the a plurality of transfer functions.

5. The method of claim 1, wherein the step of adjusting the luminance of the two pixels according to the difference value further comprises:
  adjusting the luminance of the two pixels by looking up a static image look-up table (LUT) when the difference value does not exceed the predetermined value.

6. The method of claim 5, wherein the static image LUT stores data representing a gamma transfer function.

7. The method of claim 1, further comprising:
performing overdrive processing on the current pixel and the previous pixel according to the difference value.

8. A device for eliminating image blur, comprising:
for each pixel in a first image and a second image, wherein the first image and the second image are two continuous images:
  a pixel detection circuit, for receiving a current pixel from the first image, receiving a previous pixel from the second image, and detecting a difference in pixel value between the current pixel and the previous pixel to generate a difference value, wherein the current pixel and the previous pixel respectively represent pixel data of the first image and the second image; and
  an adjustment circuit, for adjusting the luminance of the current pixel and the previous pixel according to the difference value, wherein when the difference value exceeds a predetermined value, the luminance of one pixel of the current pixel and the previous pixel is increased and the luminance of the other of the current pixel and the previous pixel is decreased;
wherein the device eliminates the image blur by utilizing pixel-based processing to detect and adjust the current pixel and the previous pixel pair by pair independently until every two pixel data in the first and second images are detected and adjusted, and the two continuous images are two time-sequential images.

9. The device of claim 8, wherein the adjustment circuit comprises a dynamic image look-up table (LUT), and the adjustment circuit is capable of adjusting the luminance of the current pixel and the previous pixel by looking up the dynamic image LUT.

10. The device of claim 9, wherein the dynamic image LUT stores data representing two transfer functions, one of the two transfer functions is utilized for increasing the luminance of images, and the other of the two transfer functions is utilized for decreasing the luminance of images.

11. The device of claim 9, wherein the dynamic image LUT stores data representing a plurality of transfer functions, each transfer function of the plurality of transfer functions corresponds to a different gamma value; the luminance of the current pixel and the previous pixel are adjusted according to the data corresponding to two of the a plurality of transfer functions.

12. The device of claim 9, wherein the adjustment circuit further comprises a static image LUT, and the adjustment circuit is capable of adjusting the luminance of the current pixel and the previous pixel by looking up the static image LUT.

13. The device of claim 12, wherein the static image LUT stores data representing a gamma transfer function.

14. The device of claim 12, wherein the adjustment circuit further comprises:
  a multiplexer, for selecting one of the adjusted pixel data derived by utilizing the static image LUT and the adjusted pixel data derived by utilizing the dynamic image LUT as an output of the adjustment circuit according to the difference value.

15. The device of claim 9, further comprising:
  a determination unit, for determining a gain value; and
  a gain adjustment unit, coupled to an output of the dynamic image LUT and the determination unit, for adjusting output data of the dynamic image LUT according to the gain value.

16. The device of claim 8, wherein the pixel detection circuit and the adjustment circuit are integrated into a chip; and the device further comprising:
  an external memory, coupled to the pixel detection circuit, for temporarily storing image data of the video signal.

* * * * *